(12) United States Patent
Purcell (10) Patent No.: US 12,029,967 B2
(45) Date of Patent: Jul. 9, 2024

(54) FIELD COVER

(71) Applicant: Inland Tarp & Liner, LLC, Moses Lake, WA (US)

(72) Inventor: Matthew Purcell, Moses Lake, WA (US)

(73) Assignee: Inland Tarp & Liner, LLC, Moses Lake, WA (US)

( * ) Notice: Subject to any disclaimer, the term of this patent is extended or adjusted under 35 U.S.C. 154(b) by 535 days.

(21) Appl. No.: 17/187,178

(22) Filed: Feb. 26, 2021

(65) Prior Publication Data

US 2022/0274006 A1    Sep. 1, 2022

(51) Int. Cl.

| | |
|---|---|
| *A63C 19/12* | (2006.01) |
| *B32B 3/04* | (2006.01) |
| *B32B 3/08* | (2006.01) |
| *B32B 5/02* | (2006.01) |
| *B32B 5/06* | (2006.01) |
| *B32B 5/26* | (2006.01) |
| *B32B 27/12* | (2006.01) |
| *B32B 27/30* | (2006.01) |
| *B32B 37/18* | (2006.01) |
| *B32B 38/00* | (2006.01) |

(52) U.S. Cl.
CPC ............. *A63C 19/12* (2013.01); *B32B 3/04* (2013.01); *B32B 3/08* (2013.01); *B32B 5/024* (2013.01); *B32B 5/026* (2013.01); *B32B 5/06* (2013.01); *B32B 5/073* (2021.05); *B32B 5/2795* (2021.05); *B32B 27/12* (2013.01); *B32B 27/304* (2013.01); *B32B 37/182* (2013.01); *B32B 38/0004* (2013.01); *B32B 2038/008* (2013.01); *B32B 2250/02* (2013.01); *B32B 2255/02* (2013.01); *B32B 2262/0253* (2013.01); *B32B 2305/186* (2013.01); *B32B 2305/188* (2013.01); *B32B 2305/38* (2013.01); *B32B 2307/71* (2013.01); *B32B 2307/712* (2013.01); *B32B 2307/7265* (2013.01); *B32B 2323/043* (2013.01); *B32B 2327/06* (2013.01); *B32B 2571/00* (2013.01)

(58) Field of Classification Search
None
See application file for complete search history.

(56) References Cited

U.S. PATENT DOCUMENTS

| | | | |
|---|---|---|---|
| D516,360 S | 3/2006 | Henning | |
| 7,270,617 B2 | 9/2007 | Henning | |
| D552,911 S | 10/2007 | Henning | |
| 2009/0159220 A1* | 6/2009 | Henning | ............... E01F 7/025 160/330 |

OTHER PUBLICATIONS

Hallaton; "Ballast System for Rain Covers and Temporary Caps," https://hallaton.com/ballast-system-for-rain-covers-and-temporary-caps/#more-1705; posted in Industry News on May 9, 2018; 12 pages.
Wind Defender; "Product Data Sheet—Wind Defender® TG;" Apr. 2020; 1 page.
Wind Defender; "Product Data Sheet—Wind Defender® HD;" Apr. 2020; 1 page.
Eurobent; "Sandmatte;" https://www.eurobent.com/en/offer/sandmatte.html; Feb. 5, 2019; 3 pages.

\* cited by examiner

*Primary Examiner* — Arti Singh-Pandey
(74) *Attorney, Agent, or Firm* — Kilpatrick Townsend & Stockton LLP (57) ABSTRACT

The present application relates to athletic field covers with wind-refracting layer.

17 Claims, 7 Drawing Sheets

FIELD COVER

BACKGROUND

Covers are commonly employed to protect athletic fields from damage that may be caused by rain and other weather elements. Improvements are sought to facilitate deployment and performance of such covers.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

Figure 1:
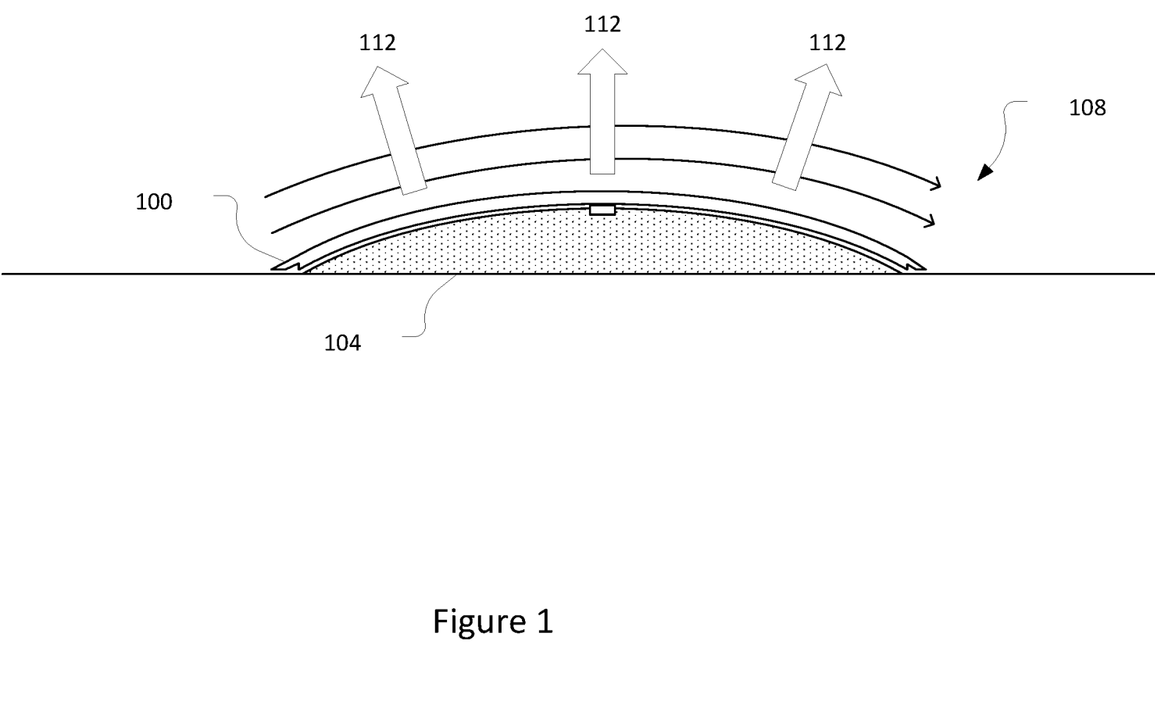
FIG. 1 illustrates an athletic field cover in accordance with some embodiments.

FIG. 1 illustrates an athletic field cover 100 in accordance with some embodiments. The athletic field cover 100 may be placed over any of a variety of fields such as athletic fields or portions thereof to protect the underlying field from weather elements including, for example, precipitation (rain, snow, hail, etc.) wind, and sun. As shown in FIG. 1, the athletic field cover 100 may be placed over a baseball mound 104. However, this is merely illustrative and is not intended to restrict embodiments.

A transverse airflow 108 over the top of the athletic field cover 100 may create an aerodynamic force 112 in a direction generally orthogonal to the surface of the athletic field cover 100. The aerodynamic force 112, which may also be referred to as dynamic lift 112, may work to pull the athletic field cover 100, or sections thereof, off the underlying substrate, for example, the baseball mound 104. This may stress or otherwise displace the athletic field cover 100.

Conventional athletic field covers may employ significant weighting or anchoring structures to address dynamic lift caused by a transverse airflow. These weighting or anchoring structures add additional expense and compromise ease of deployment of the covers. Further, these structures may provide additional stress points for the cover, reducing the effective life of the product. In contrast, the athletic field cover 100 is designed in a manner to reduce the dynamic lift 112 caused by the transverse airflow 108. As used herein, reducing the dynamic lift 112 may include a partial reduction or elimination of the dynamic lift. By reducing the dynamic lift 112, the athletic field cover 100 may include significantly less weighting/anchoring structures as compared to conventional athletic field covers. This may, in turn, reduce expense, facilitate deployment, or increase life of the athletic field cover 100.

Figure 2:
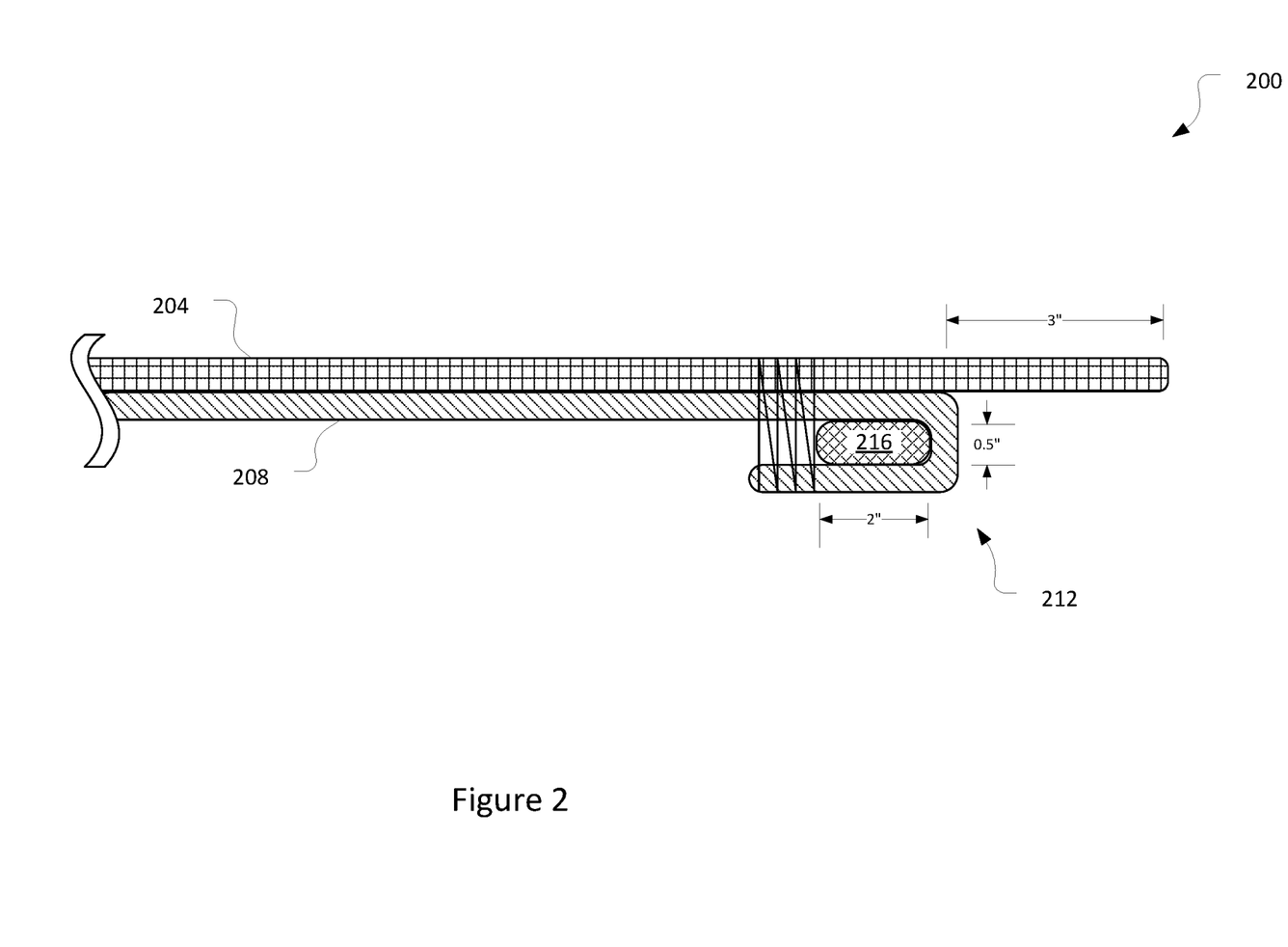
FIG. 2 illustrates a cross-sectional view of the athletic field cover in accordance with some embodiments.

FIG. 2 includes a cross-sectional view of the athletic field cover 100 in accordance with some embodiments. The athletic field cover 100 may include a mesh layer 204 that is coupled with and overlaying an element barrier (EB) layer 208.

The EB layer 208 may be a layer designed to protect a surface from one or more weather elements. For example, the EB layer 208 may be a waterproof layer, a water-resistant layer, or an ultraviolet resistant layer.

In the event the EB layer 208 is a waterproof or water-resistant layer it may include hydrophobic properties that resists penetration of water in its liquid state. In some embodiments, a waterproof layer may be constructed from a coated woven polyethylene (CWPE). A CWPE layer may be made from a woven high-density polyethylene (HDPE) tape (which may be referred to as "base fabric" or "scrim") that provides a high tear strength and puncture resistance. The HDPE tape may be coated on both sides with a low-density polyethylene (LDPE) to provide flexible barriers to prevent passage of liquids. In some embodiments, the CWPE layer may be a three-ply layer with one HDPE tape coated on the top and bottom. In other embodiments, additional number of HDPE tapes and LDPE coats may be used.

In some embodiments, the EB layer 208 may be a polyvinyl chloride (PVC) layer. The PVC layer may be made with any of a number of additives to provide desired properties for the EB layer 208. For example, the PVC layer may include plasticizers to soften and increase flexibility of the PVC layer, ultra-violet (UV) stabilizers to resist sun-damage, flame-retardants, etc.

The EB layer 208 may have a thickness of 12 mils in one embodiment. In other embodiments, other thicknesses may be used such as, but not limited to, 16 mils, 20 mils, 24 mils, or 30 mils.

The EB layer 208 may include a hem 212 that encompasses a ballast 216. The ballast 216 may provide a weight designed to keep the athletic field cover 100 in place upon deployment. The desired size and weight of the ballast 216 may be selected based on the objectives of a particular embodiment. However, given the wind-refraction properties of the mesh layer 204, the ballast 216 may keep the athletic field cover 100 in place with significantly less weight and bulk as compared to conventional athletic field covers.

In some embodiments, the ballast may include a strip of sand-impregnated geotextile. The strip of sand-impregnated geotextile may be a polypropylene structure with cross-sectional dimensions of approximately 2 inches by 0.5 inches as shown in FIG. 2; however, the strip may be made of other structures or include other dimensions in other embodiments.

In some embodiments, the ballast 216 may include other materials including, for example, a metal chain, rod, plate, etc.

Stitching 220 may secure the ballast 216 within the hem 212 and may further couple the mesh layer 204 to the EB layer 208. In some embodiments, the coupling of the EB layer 208 to the mesh layer 204 may be done at a perimeter of the athletic field cover 100. In other embodiments, the stitching 220 may couple the EB layer 208 to the mesh layer 204 at additional/alternative coupling points.

In other embodiments, the ballast 216 may be coupled with the mesh layer 204 instead of the EB layer 208. For example, the mesh layer 204 may include a hem having the ballast 216, with the hem of the mesh layer 204 stitched to the EB layer 208.

In some embodiments, the EB layer 208 may be coupled with the mesh layer 204 in ways other than the stitching 220. For example, the EB layer 208 may be coupled with the mesh layer 204 using an adhesive applied to a perimeter or other portions.

In some embodiments, an interface layer (not shown) may be disposed between the EB layer 208 and the mesh layer 204. The interface layer may be selected based on any of a number of desired properties. For example, in some embodiments, the interface layer may be used to facilitate a coupling of the mesh layer 204 to the EB layer 208 with, for example, an adhesive. In another example, the interface layer may be used to enhance, provide, or supplement the hydrophobic properties of the EB layer 208.

The mesh layer 204 may hang over the end of the hem 212 by an amount that, when laid down, allows the mesh layer 204 to come in contact with the ground. This may reduce the chances of an airflow getting under the athletic field cover 100. As shown, the mesh layer 204 may include a three inch overhang, but the amount may be different in other embodiments.

The mesh layer 204 may be composed of knitted HDPE filaments. The HDPE filaments may include additives to improve desired characteristics such as those discussed above with respect to the CWPE layer.

Figure 3:
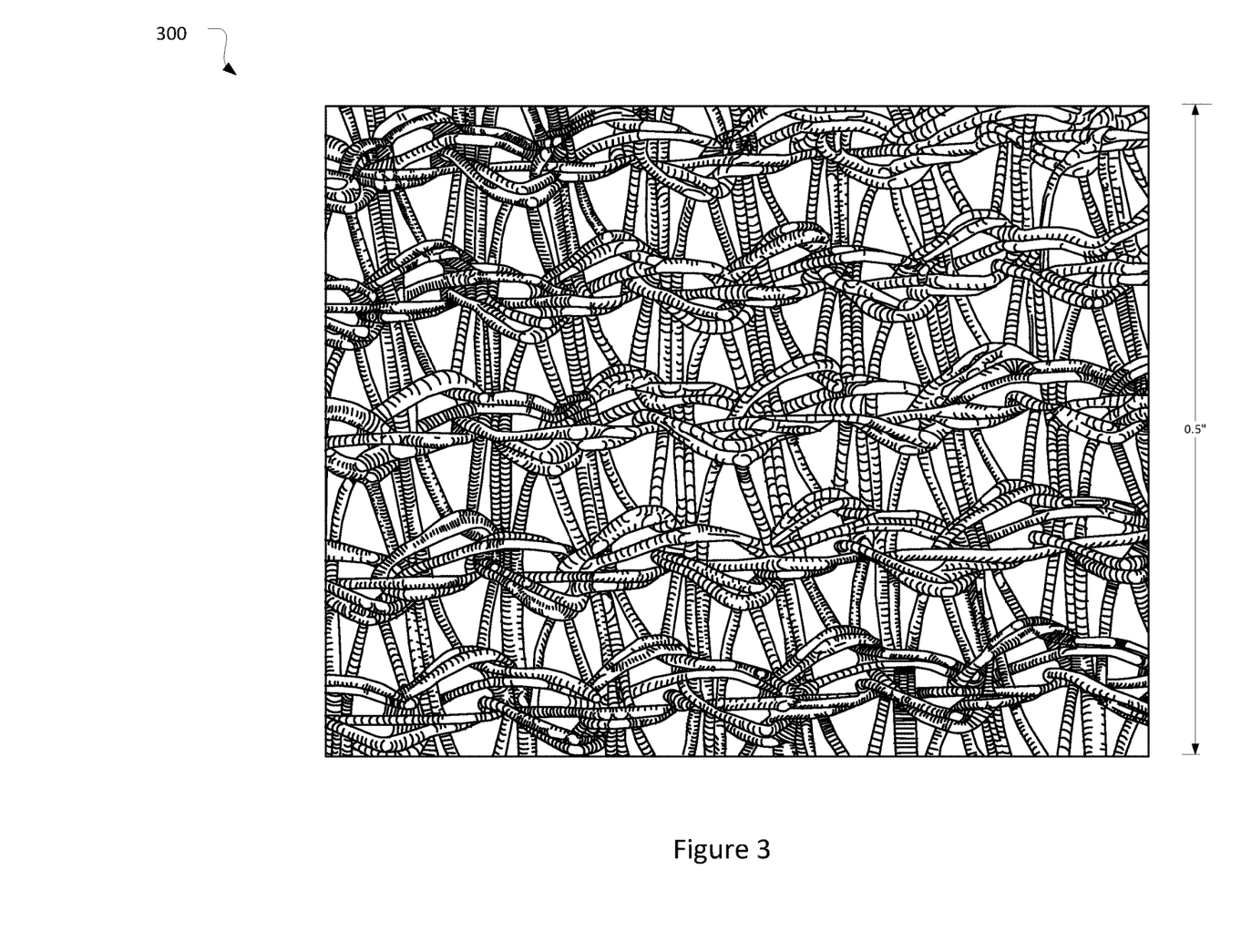
FIG. 3 illustrates view of a mesh layer in accordance with some embodiments.

The knitting and scale of the mesh layer 204 is shown in FIG. 3 in accordance with some embodiments. In general, the mesh layer 204 may be a warp-knitted structure with monofilament yarn zigzagging along the length (or "warp") of the mesh layer 204. In some embodiments, monofilament yarn may also transverse the width (or "weft") of the mesh layer 204. The mesh layer 204 may be formed on a Raschel machine. In various embodiments, other knitting (for example, warp or waft), stitch-bonding, weaving, or sewing patterns may be used to produce the mesh layer 204.

The mesh layer 204 may be a porous structure that allows passage of airflow from a first major surface to a second major surface. The major openings or pores of the mesh layer 204 may be in the range of ⅟₃₂-⅟₁₆ inches. The mesh layer 204 may have a thickness of approximately 40-60 mils.

Figure 4:
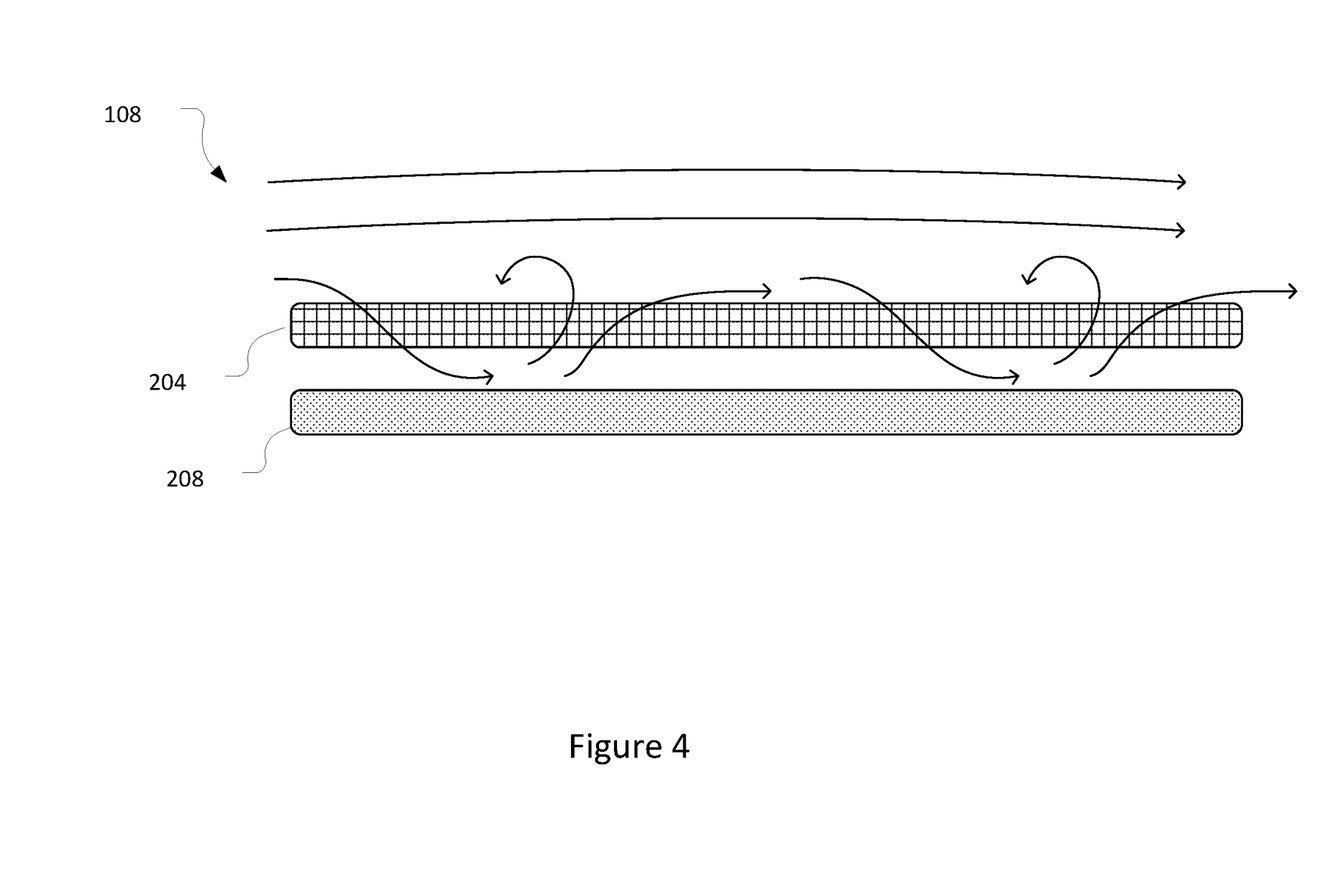
FIG. 4 illustrates a cross-sectional view of the mesh layer and EB layer in accordance with some embodiments.

FIG. 4 illustrates an exploded, cross-sectional view of the EB layer 208 and the mesh layer 204 in accordance with some embodiments. The porosity of the mesh layer 204 may disrupt a laminar flow of the airflow 108 closest to the mesh layer 204 and may introduce a turbulent flow through the mesh layer 204 itself. Thus, the mesh layer 204 may refract the wind to provide a boundary layer separation immediately adjacent to the athletic field cover 100. The turbulence of the airflow 108 adjacent to the athletic field cover 100, in conjunction with the ability of the air to pass freely through the mesh layer 204 from areas of high- to low-pressure, may reduce the presence of significant low pressure areas that could result in dynamic lift that would stress the athletic field cover 100.

Figure 5:
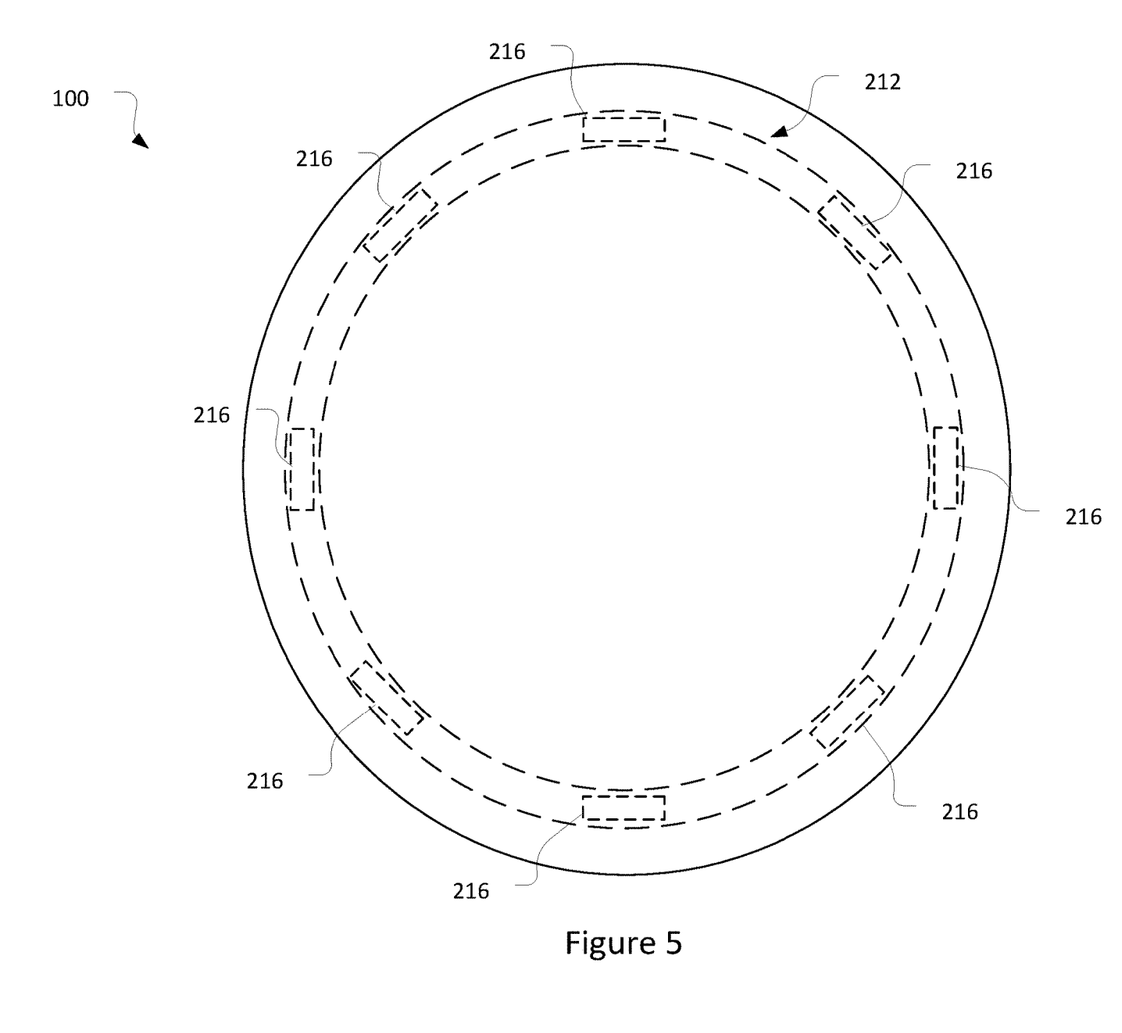
FIG. 5 illustrates a top-plan view of the athletic field cover in accordance with some aspects.

FIG. 5 illustrates a top-plan view of the athletic field cover 100 in accordance with some embodiments. The athletic field cover 100 is shown with a circular shape; however, in other embodiments, the athletic field cover 100 may be any other shape to suit objectives of a particular embodiment.

The athletic field cover 100 may include the ballasts 216 placed within the hem 212 of the EB layer 208 around the perimeter of the athletic field cover 100. As shown, a plurality of ballasts 216 may be within the hem 212. In other embodiments, one continuous ballast 216 may be placed within the hem 212.

Figure 6:
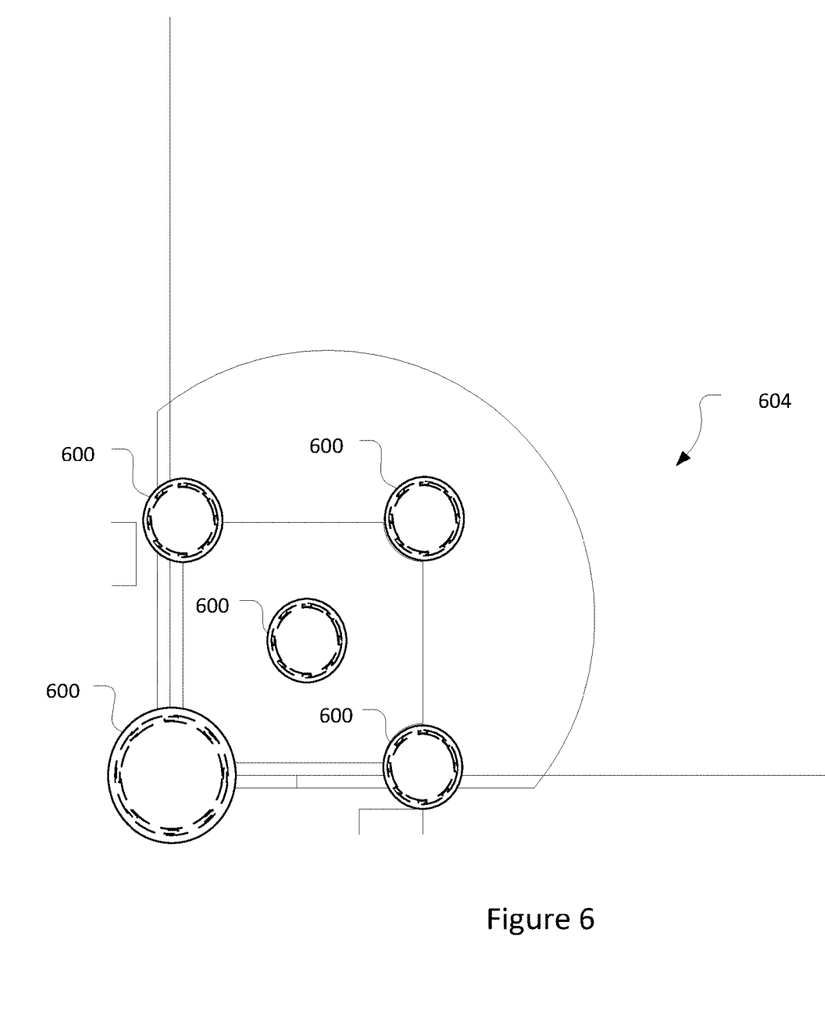
FIG. 6 illustrates deployment of athletic field covers in accordance with some aspects.

FIG. 6 illustrates deployment of athletic field covers 600 in accordance with some embodiments. The athletic field covers 600 may be similar to, and substantially interchangeable with, athletic field cover 100. In this embodiment, the athletic field covers 600 may be placed on areas of a baseball field 604. In particular, the athletic field covers 600 may be placed on a pitcher's mound, each of the bases, and home plate.

The athletic field covers 600 designed with the wind-refracting mesh layer as discussed herein, may have relatively lightweight ballasts. Thus, each of the athletic field covers 600 may be easily and quickly deployed by one person. This may help to preserve the integrity of the underlying areas of the baseball field 604 in the event that inclement weather were to suddenly occur.

While FIG. 6 illustrates the athletic field covers 600 deployed on a baseball field 604, similar athletic field covers may be employed in a variety of contexts. For example, athletic field covers described herein may be designed for baseball bullpens, softball/football/soccer/lacrosse/field hockey/cricket/rugby fields (or portions thereof); long/triple-jump pits; tennis/pickleball courts; lawn bowling; etc.

Figure 7:
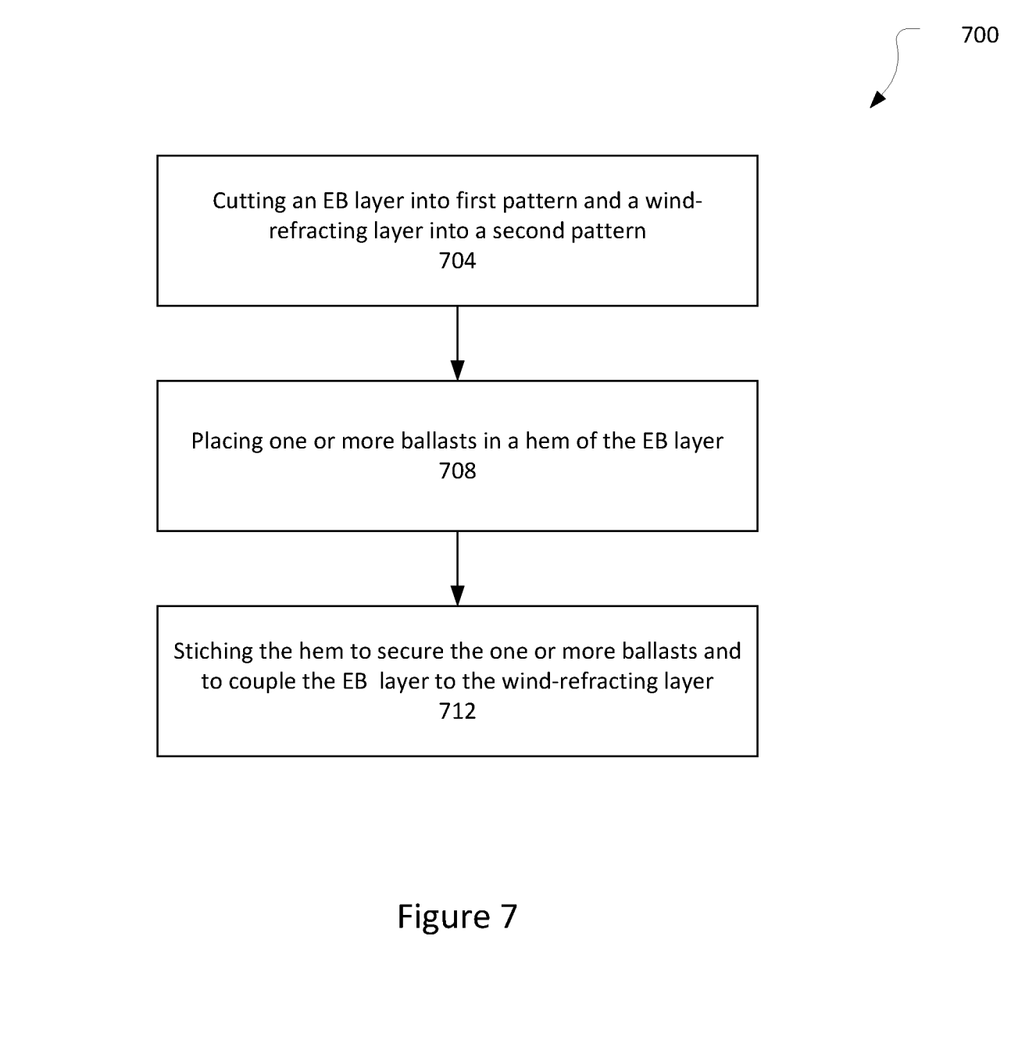
FIG. 7 illustrates an operational flow for manufacturing an athletic field cover in accordance with some aspects.

FIG. 7 illustrates an operational flow 700 for manufacturing an athletic field cover such as athletic field covers 100 or 600 in accordance with some embodiments.

The operational flow 700 may include, at 704, cutting an EB layer into a first pattern and cutting a wind-refracting layer into a second pattern. The EB layer may be similar to EB layers described elsewhere herein, while the wind-refracting layer may be similar to mesh layers described elsewhere herein.

The second pattern may be similar to the first pattern in both size and shape. The first and second patterns may be circle, rectangle, square, or any other pattern to complement a surface of an athletic field of a particular application.

The operational flow 700 may further include, at 708, placing one or more ballasts in a hem of the EB layer. As described elsewhere herein, the ballasts may include one or more strips of a sand-impregnated geotextile. Other embodiments may include additional/alternative ballasts.

The operational flow 700 may further include, at 712, stitching the hem to secure the one or more ballasts in the hem. The stitching of the hem at 712 may further couple the EB layer to the wind-refracting layer. The stitching of the hem may be accomplished by conventional needle-punching processes.

The hemming of the EB layer may provide an overhang portion of the wind-refracting layer. The size of the overhang portion, and the hem, may be adjusted to account for specifics of a particular embodiment.

EXAMPLES

In the following sections, further exemplary aspects are provided.

Example 1 includes an athletic field cover that includes: an EB layer to protect a surface from one or more weather elements; a mesh layer coupled with and overlaying the EB layer, the mesh layer to reduce a dynamic lift exerted on the EB layer by an airflow adjacent to the mesh layer; and a ballast coupled with a perimeter of the mesh layer or the EB layer.

Example 2 includes the athletic field cover of example 1 or some other example, wherein the mesh layer comprises a knit structure of HDPE filaments.

Example 3 includes the athletic field cover of example 2 or some other example, wherein the knit structure is a warp knit structure.

Example 4 includes the athletic field cover of example 1 or some other example, wherein the mesh layer is coupled with the EB layer by being stitched to a hem of the EB layer.

Example 5 includes the athletic field cover of example 1 or some other example, wherein the ballast comprises one or more strips of sand-impregnated geotextile.

Example 6 includes the athletic field cover of example 5 or some other example, wherein the one or more strips of sand-impregnated geotextile is coupled within a hem of the EB layer.

Example 7 includes the athletic field cover of example 1 or some other example, wherein the EB layer is a waterproof layer; a water-resistant layer; or an ultraviolet resistant layer.

Example 8 includes the athletic field cover of example 7 or some other example, wherein the EB layer comprises a coated woven polyethylene layer.

Example 9 includes the athletic field cover of example 7 or some other example, wherein the EB layer comprises a polyvinyl chloride layer.

Example 10 includes an athletic field cover comprising: an element-barrier (EB) layer comprising a coated woven polyethylene layer or a polyvinyl chloride layer; a knitted mesh layer coupled with and overlaying the EB layer, the knitted mesh layer to allow an airflow between a first major surface of the knitted mesh layer and a second major surface of the knitted mesh layer; and a ballast coupled with a perimeter of the knitted mesh layer or the EB layer.

Example 11 includes the athletic field cover of example 10 or some other example, wherein the knitted mesh layer comprises high-density polyethylene (HDPE) filaments.

Example 12 includes the athletic field cover of example 10 or some other example, wherein the knitted mesh layer is a warp knit structure.

Example 13 includes the athletic field cover of example 10 or some other example, wherein the knitted mesh layer is coupled with the EB layer by being stitched to a hem of the EB layer.

Example 14 includes the athletic field cover of example 10 or some other example, wherein the ballast comprises one or more strips of sand-impregnated geotextile.

Example 15 includes the athletic field cover of example 14 or some other example, wherein the one or more strips of sand-impregnated geotextile is coupled within a hem of the EB layer.

Example 16 includes the athletic field cover of example 10 or some other example, wherein the EB layer comprises a coated woven polyethylene layer.

Example 17 includes the athletic field cover of example 10 or some other example, wherein the EB layer comprises a polyvinyl chloride layer.

Example 18 includes a method of manufacturing an athletic field cover, the method comprising: placing one or more ballasts in a hem of an element barrier (EB) layer; and stitching the hem of the EB layer to secure the one or more ballasts in the hem and to couple the EB layer to a knitted mesh layer that overlays the waterproof layer.

Example 19 includes the method of example 18 or some other example, wherein the method further comprises: cutting the EB layer into a first pattern; and cutting the knitted mesh layer into a second pattern that is similar to the first pattern.

Example 20 includes the method of example 19 or some other example, wherein stitching the hem comprises: stitching the hem to provide an overhanging portion of the knitted mesh layer with respect to the EB layer.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A cover comprising:
an element-barrier (EB) layer to protect a surface from one or more weather elements;
a mesh layer coupled with and overlaying the EB layer, the mesh layer to reduce a dynamic lift exerted on the EB layer by an airflow adjacent to the mesh layer; and
a ballast coupled with a perimeter of the mesh layer or the EB layer,
wherein the mesh layer comprises a knit structure of high-density polyethylene (HDPE) filaments.

2. The cover of claim 1, wherein the knit structure is a warp knit structure.

3. The cover of claim 1, wherein the mesh layer is coupled with the EB layer by being stitched to a hem of the EB layer.

4. The cover of claim 1, wherein the ballast comprises one or more strips of sand-impregnated geotextile.

5. The cover of claim 4, wherein the one or more strips of sand-impregnated geotextile is coupled within a hem of the EB layer.

6. A cover comprising:
an element-barrier (EB) layer to protect a surface from one or more weather elements;
a mesh layer coupled with and overlaying the EB layer, the mesh layer to reduce a dynamic lift exerted on the EB layer by an airflow adjacent to the mesh layer; and
a ballast coupled with a perimeter of the mesh layer or the EB layer,
wherein the EB layer is a coated woven polyethylene layer that is waterproof; water-resistant; or ultraviolet resistant.

7. The cover of claim 6, wherein the mesh layer is coupled with the EB layer by being stitched to a hem of the EB layer.

8. The cover of claim 6, wherein the ballast comprises one or more strips of sand-impregnated geotextile.

9. The cover of claim 8, wherein the one or more strips of sand-impregnated geotextile is coupled within a hem of the EB layer.

10. A cover comprising:
an element-barrier (EB) layer comprising a coated woven polyethylene layer or a polyvinyl chloride layer;
a knitted mesh layer coupled with and overlaying the EB layer, the knitted mesh layer to allow an airflow between a first major surface of the knitted mesh layer and a second major surface of the knitted mesh layer; and a ballast coupled with a perimeter of the knitted mesh layer or the EB layer.

11. The cover of claim 10, wherein the knitted mesh layer comprises high-density polyethylene (HDPE) filaments.

12. The cover of claim 10, wherein the knitted mesh layer is a warp knit structure.

13. The cover of claim 10, wherein the knitted mesh layer is coupled with the EB layer by being stitched to a hem of the EB layer.

14. The cover of claim 10, wherein the ballast comprises one or more strips of sand-impregnated geotextile.

15. The cover of claim 14, wherein the one or more strips of sand-impregnated geotextile is coupled within a hem of the EB layer.

16. The cover of claim 10, wherein the EB layer comprises a coated woven polyethylene layer.

17. The cover of claim 10, wherein the EB layer comprises a polyvinyl chloride layer.

\* \* \* \* \*